B. A. REVELLI.
AUTOMATIC GUN.
APPLICATION FILED SEPT. 14, 1908.
1,073,709.
Patented Sept. 23, 1913
5 SHEETS—SHEET 3.
Fig. 6.
Fig. 7.
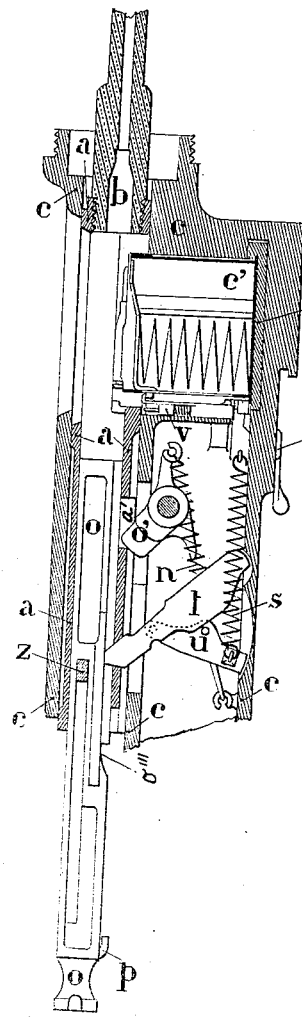
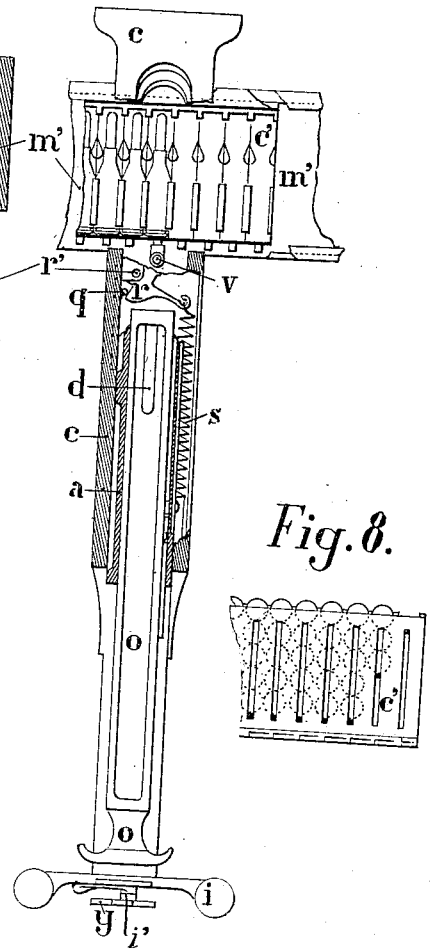
Fig. 8.
Witnesses:
H. K. Boulter
M. W. Darq
Inventor
Bethel A. Revelli,
By Wm E. Boulter
attorney B. A. REVELLI.
AUTOMATIC GUN.
APPLICATION FILED SEPT. 14, 1908.
1,073,709.
Patented Sept. 23, 1913.
5 SHEETS—SHEET 4.
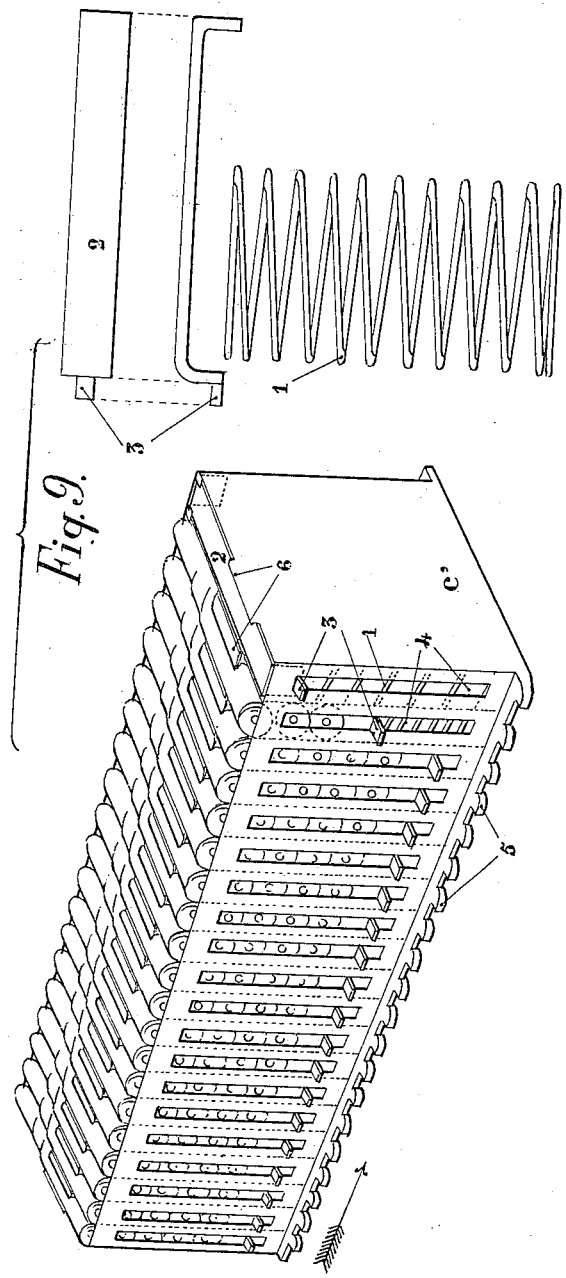
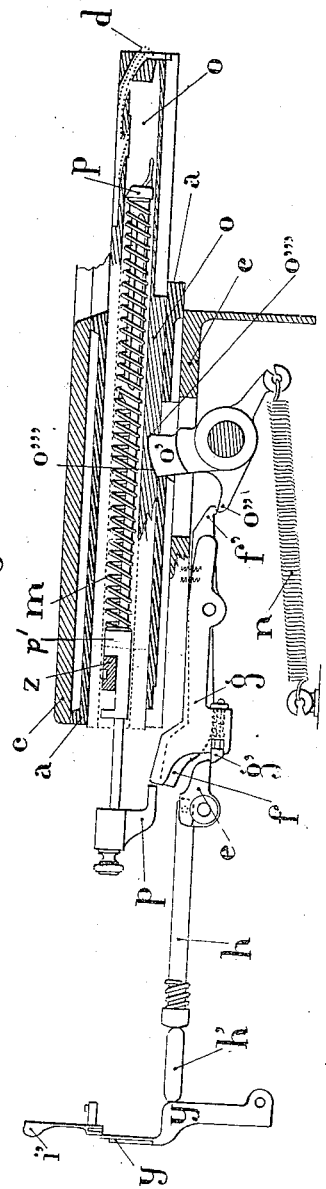
Witnesses
Mary W. Day
Leila A. Price
Inventor
Bethel A. Revelli
By Wm. E. Boulter
Attorney B. A. REVELLI.
AUTOMATIC GUN.
APPLICATION FILED SEPT. 14, 1908.
1,073,709.
Patented Sept. 23, 1913.
5 SHEETS—SHEET 5.
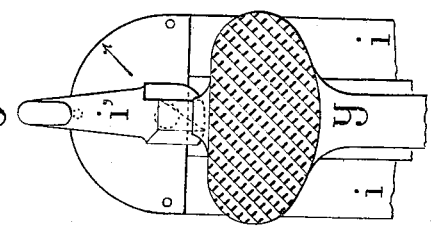
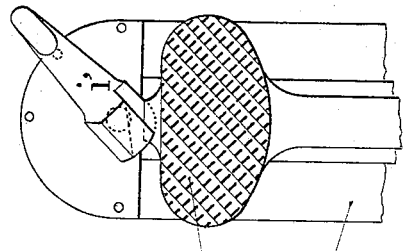
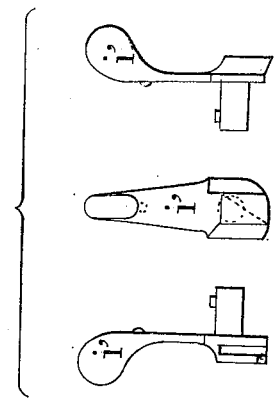
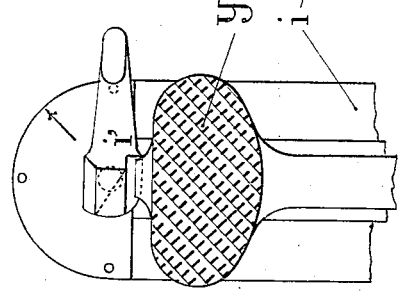
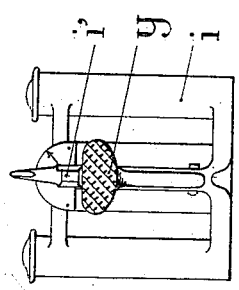
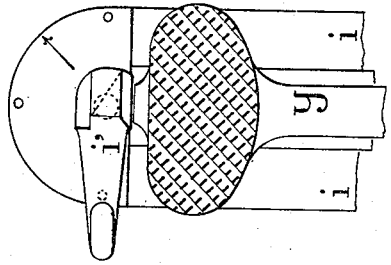
Witnesses
Mary H. Darg.
Leila A. Price.
Inventor
Bethel A. Revelli
By Wm E Boulter
Attorney

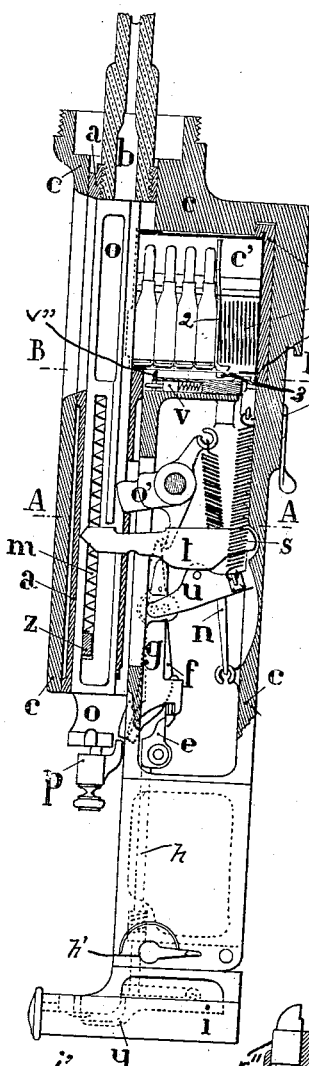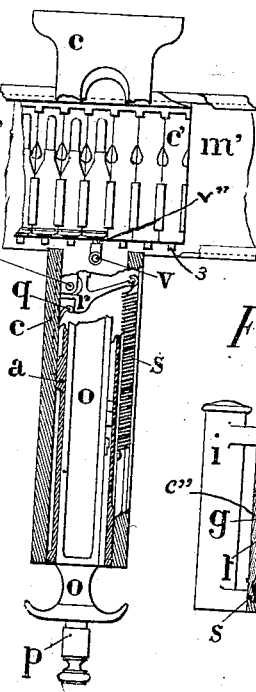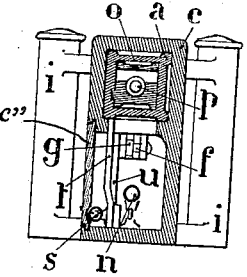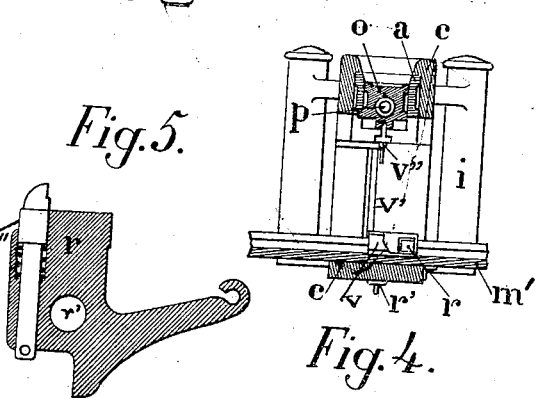

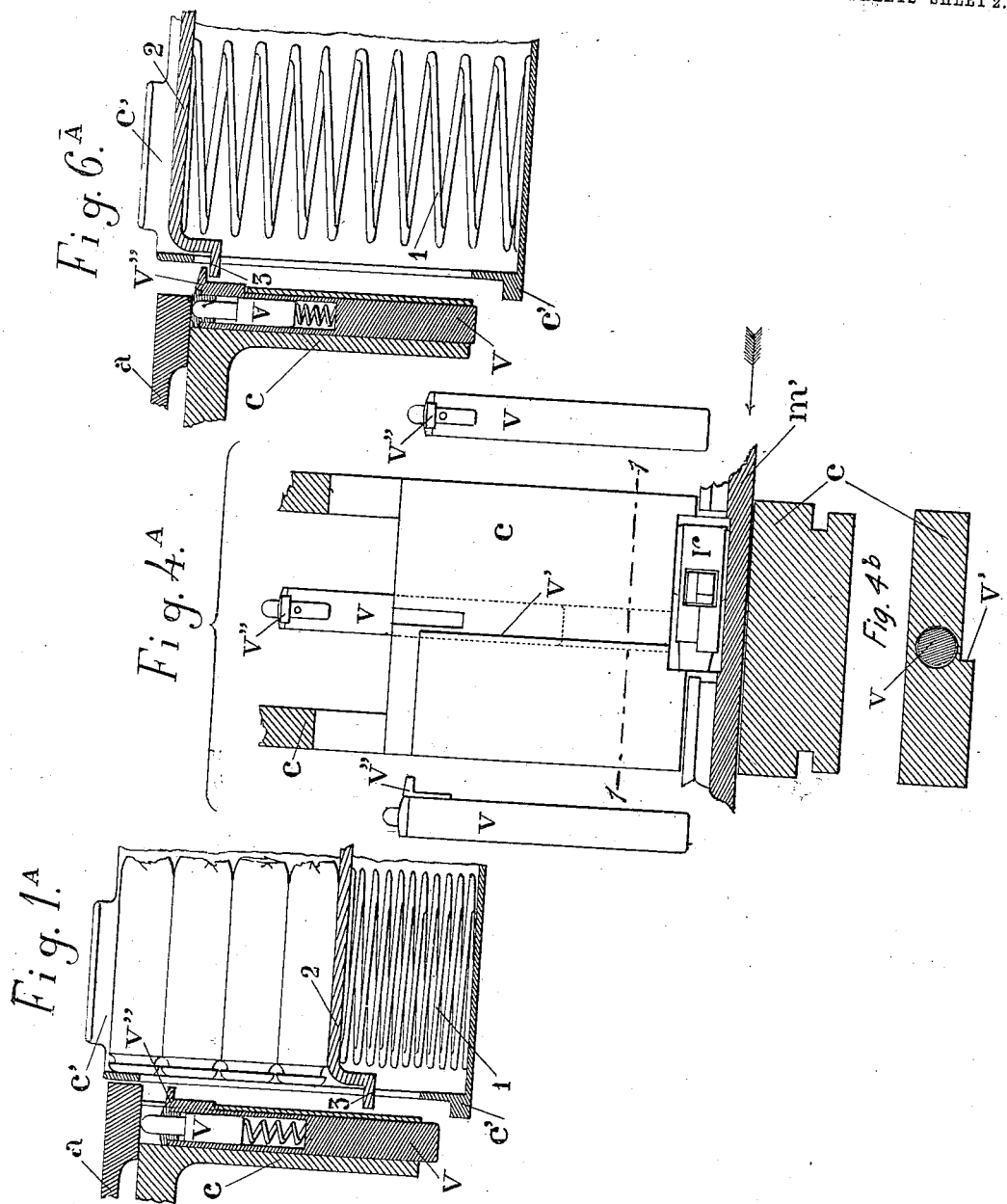

UNITED STATES PATENT OFFICE.

BETHEL ABIEL REVELLI, OF ROME, ITALY.

AUTOMATIC GUN.

1,073,709.

Specification of Letters Patent.  Patented Sept. 23, 1913.

Application filed September 14, 1908. Serial No. 452,944.

*To all whom it may concern:*

Be it known that I, BETHEL ABIEL REVELLI, a subject of the King of Italy, residing at Rome, Italy, have invented a certain new and useful Improved Automatic Gun, of which the following is a specification.

This invention relates to an automatic gun and has for its object to provide an improved loading system of great simplicity which will enable the gun to be easily manipulated even by soldiers who have been taught only in a very superficial manner.

It consists of 35 parts without screws, easily detachable, so that the worn out parts can be replaced without the help of accessories.

Referring to the accompanying drawings which illustrate the preferred embodiment of the invention:—Figure 1 is a side elevation of the gun, the front part being in section; Fig. 2 is a plan, partly in section, of part of Fig. 1; Fig. 3 is a vertical cross-section on line A—A of Fig. 1, looking in the direction of the rear of the gun; Fig. 4 is a vertical cross-section on line B—B of Fig. 1, also looking toward the rear of the gun; Fig. 5 is an enlarged view of a detail of the mechanism; Fig. 6 is a side elevation, partly in section, of part of the gun, the parts being in different operative positions to those shown in Fig. 1; Fig. 7 is a plan, partly in section, of the gun when the parts are in similar positions to those shown in Fig. 6; Fig. 8 is an elevation of the rear face of part of the cartridge feeding mechanism. Fig. 9 is a perspective view on an enlarged scale of the whole of the cartridge feeding mechanism, two details being shown detached. Fig. 10 is an elevation, partly in section, of the trigger mechanism and parts operating therewith, also on an enlarged scale, and Figs. 11, 11', 11², 11³, 11⁴ and 11⁵ are elevations on an enlarged scale showing the construction and coöperation of the parts controlling and indicating the different ways of firing which may be employed. Figs. 1ᴬ, 4ᴬ and 6ᴬ show the operation of the regulator of the bell crank lever and the vertical projection or step against which is arrested each compartment in the progressive advancement of the charging device during the shooting. Fig. 4ᵇ is a horizontal sectional view on line 1—1 of Fig. 4ᵃ.

The gun comprises the following parts:

*a.* The body *c* which is a parallelepiped in shape is formed at the top with a longitudinal recess for the barrel extension *a* (to which the barrel *b* is screwed), and with an opening for ejecting the cartridges; at the bottom with a recess for the cartridge feed and firing mechanisms, and in front with a transverse opening with a supporting plate *m'* for the charging device *c'*. The recess for the firing and the feed mechanisms is closed at the right hand side by a sliding panel *c''* secured by means of a spring button (Fig. 3).

*b.* A closing mechanism comprising the following parts: a barrel extension *a* of square cross-section sliding in the body and screwed to the barrel *b*, a breech-block *o* sliding in its turn in the barrel extension, a closing lever *o'* mounted by means of a pivot pin screwed into the two trunnion holders for the body *c* and a stop bar *z* which traverses the body —*c*— and the three parts; barrel extension, breech block —*o*— and striking pin or striker —*p*—.

*c.* A firing mechanism comprising: a striking pin or striker *p*, a helical spring *m* (which also operates as a recuperating spring at the recoil), two levers pivoted to the body, (the left hand one *f* for automatic firing, and the right hand *q* for firing at will), a trigger *e* controlled by a longitudinal rod *h*, a trigger button *h'* and a press button *y* for the trigger, pivoted to the handle (Fig. 10).

*d.* A feed mechanism comprising: a lever *t* pivoted to the bottom portion of the body, a counter lever *u* pivoted to the upper portion of the body and a bell crank lever *r* effecting the gradual advance of the charging device *c'* (Figs. 1, 2, 6, 7 and 8).

*e.* A double handle *i* fitted with the trigger and an indicator *i'* for showing the different methods of firing which can be safely obtained with this gun *i. e.* fire at will, rapid automatic fire and auto-rapid automatic fire. (Figs. 1 and 7).

*f.* A charging device (Fig. 8) consisting of a sheet metal parallelepiped box *c'* subdivided into a number of vertical compartments, each of which comprises a spring 1 for the elevator, an elevator 2 with an extension-piece 3 capable of sliding in a vertical rectangular opening 4 in the compartment from which it projects outside. Each compartment is provided at the top with turned over flanges 6 for retaining the cartridges. The charging device is provided at the bottom with two lateral longitudinal sides one of which is provided with a toothed rack which slides on the plate $m'$.

Referring now more particularly to the individual figures, Fig. 1 shows: 1. The gun closed by the action of the closing lever $o'$. 2. The feed levers $t$ $u$ in the position of rest. 3. The charging device on its sliding supporting plate $m'$ with one cartridge fired and the case ejected. 4. The striker $p$ cocked with its spring $m$ partly compressed, see Fig. 10. 5. The two sears $g$ $f$ and the trigger $e$. The sear $g$ on the right for firing at will, and the sear $f$ at the left for automatic firing independent of the trigger $e$.

Fig. 2 shows: 1. The bell crank lever $r$ mounted on its pivot $r'$. 2. The charging device $c'$ with three of its compartments empty. 3. The front portions of the body $c$ and of the barrel extension $a$, the breech block $o$ closed and the spring $q$ keeping the lever $r$ in the position of rest.

Fig. 3 shows: 1. The body $c$ containing the barrel extension $a$ which in its turn contains the sliding breech block $o$. 2. The sliding panel $c''$ closing the mechanism box on the right hand side of the body. 3. The feed levers $t$ $u$. 4. The sears $g$ $f$. 5. The striker $p$ with the interior of the breech-block $o$.

Fig. 4 shows: 1. The three parts $c$ $a$ $o$ in section. 2. The lever $r$ and its vertical regulator $v$ sliding in the interior of the body. 3. The supporting plate $m'$ for the charging device $c'$. 4. The striker $p$ with the interior of the breech block $o$.

Fig. 5 shows the bell crank lever $r$ on an enlarged scale so as to show more clearly its escapement tooth —$r''$— which engages with the rack 5 of the charging device $c'$ Fig. 9.

Fig. 6 shows: 1. The breech block $o$ at its maximum recoil point, with its notch —$o'''$—. 2. The closing lever $o'$ completely lowered backward. 3. The two feed levers $t$ $u$ with the spring $s$ cocked acting on the lever $r$ which advances the charging device $c'$ only for each compartment emptied. 4. The regulator $v$ is raised by the back extension 3 of the elevator 2 which still contains the last cartridge of one compartment of the charging device $c'$ about to be introduced into the barrel as soon as the breech block $o$ advances.

Fig. 7 shows the junction of the back part of the body and of the double handle $i$, with the press button $y$ and the firing indicator $i$.

Figs. 8 and 9 show: 1. The charging device $c'$ with vertical compartments. The first compartment no longer has any cartridges, and the back extension 3 of its elevator 2 which has completed its travel, is at the top of the corresponding rectangular opening 4. The second compartment still has three cartridges, all other compartments are full. At the bottom may be seen the teeth of the rack 5 with which the escapement tooth of the driver $r$ has engaged for advancing the charging device to the extent of one notch as soon as the cartridges of one compartment are exhausted. 2. The elevator 2 with its vertical spring 1. In this figure the parts 1 and 2 are shown separate from the other details for the sake of clearness.

Fig. 10 shows particularly: 1. The trigger system with the mechanism which operates the right hand sear $g$ and that for the left hand sear $f$. 2. The press button $y$, the button $h'$, the rod $h$, the trigger $e$ for firing at will with the right hand sear $g$. 3. The extension $o''$ of the closing lever $o'$ which acts on the left hand sear $f$ for rapid automatic firing when the position of the cam $i'$ puts the movement for firing at will out of action.

With reference to Figs. 11 to 11$^V$ illustrating the indicator cam $i'$, Fig. 11$'$ shows the cam lever which has parts of various thickness and an operating arm turned by hand like the hand on a quadrant bearing the four indications of firing as hereinafter explained. (1) Indicator cam turned upward, in position of safety: Figs. 11$''$ and 10. In this position the indicator cam has its maximum thickness against the press button $y$ so that this cannot advance and remains stationary as also do the parts $h'$ and $h$, so that the trigger cannot fire a cartridge. (2) Indicator cam $i'$ is turned to the left for intermittent firing, that is to say one shot at a time, Fig. 11$'''$. In this position the cam of the indicator does not present any thickness against the press button $y$ so that this in moving under the indicator has its entire passage free, so that its pressure against the button $h'$ causes this to effect its longest movement which is transmitted to the rod $h$ which causes the trigger $e$ to rotate, and its head being lowered to the maximum, also brings down to the maximum the right sear $g$ releasing the striker device $p$ that is to say effecting the firing. In the maximum downward movement of the head of the trigger $e$ this passes under the escapement tooth $g'$ of the sear $g$ which immediately springs up to its former position by reason of the small coil spring acting on its tail. By releasing the pressure of the finger on $y$ the coil spring of $h$ in opening out brings back the trigger $e$ to its normal position of rest, and its head, in order to rise, presses the escapement tooth $g'$ and passes over it, being again ready to operate. (3) Indicator cam is turned to the right for quick firing, Fig. 11$^{IV}$. In this position the cam of the indicator has its medium thickness against $y$ so that the passage of parts $y$, $h'$, $h$, $e$ caused by the continued pressure of the finger on y is reduced to half that previously possible. In these conditions the trigger e is lowered only in part and thus the sear lever is only lowered sufficiently to release permanently the foot of the striker device p and prevent the lever g from returning up so long as the pressure of the finger on the press button y is maintained. At this point when the first shot is fired, there comes into operation the left side sear f which only obeys the movements of the tail o″ of the closing lever o′. Each time that the breech block o in the recoil opens the parts o′ and o″ are lowered, as also is the tail f′ of the lever f which is pressed by its coil spring, while the opposite part of the lever f rises to its normal position relatively to the foot of the striker device p. In the closing of the breech block o while the closing lever o′ rises the part o″ is also raised, pushing up the tail f′ of the lever f whose opposite end comes down causing the automatic firing. Thus in quick firing the right side sear g is kept inactive and stationary by the continued pressure of the finger on y and the firing produced by the left side sear f takes place automatically at each perfect closing of the breech of the gun. (4) Indicator cam is turned at 45° to the right upward for automatic firing, Figs. 11ᵛ and 10. If during quick firing the operator should want to leave hold of the gun or to cease the pressure of the thumb on the press button y the firing would immediately cease. The operator can avoid this suspension by fixing y in its position of automatic quick firing, by turning the indicator cam from position 3 to position 4. This rotation fixes the head of press button y in a notch or groove in the side of the cam. From the above it appears that the sear g on the right can be changed at will to position of rest, while the sear f on the left is always in position relatively to the foot of the striker device p, and does not release it except when the gun breech is perfectly closed, because only in this case the part f is lowered by effect of the upward movement of f′ caused by the rise of the tail o″ of the closing lever o′.

Working: The working of the gun is as follows:—The breech block o is pulled back with the right hand, and with the left hand, the charging device c′ is pushed on the supporting plate m′ until it strikes the vertical projection of the transverse opening of the body. The breech block o is then released and owing to the expansion of the recuperating spring m (in its interior and which is also the spring for the striker p) returns to the front and drives into the barrel a cartridge from the charging device. The closing lever o′ pushed forward by its spring n, becomes wedged between a slot a′ of the barrel extension —a— and its recess o‴ at the bottom portion of the block —o—, so as to insure perfect closing between the barrel extension and the breech block at the moment of firing. The striker device p does not travel the whole of its course like the breech block forward but is held back by the right hand sear g whereby it is cocked. In order to fire, the press button y mounted on the double handle i is actuated. The whole of the pressure is transmitted to the trigger e by the button h′ and the rod h. The trigger e then operates on the right hand sear g which being lowered, releases the striker pin which can thus advance for firing. Immediately after the sear g and the trigger e return to their places by reason of the tooth g′ and the coiled spring of the rod h (see Fig. 10). The left hand sear f for rapid firing, cannot hinder the release of the striker p, because it is completely lowered after the complete closing of the gun (Fig. 10). It should be noticed that the head of the left hand sear f is slightly behind the head of the right hand sear g and as it only obeys the movements of the projection —o″— of the closing lever o′ always remains raised under the action of a small spring at its hinder part when the breech is open; the breech is closed perfectly when the projection —o″— of the lever o′ lowers the sear f and leaves the firing pin under control of the right hand sear g which remains raised and allows it to be cocked. That affords a guaranty that the gun could not be fired in the event of the breech being incompletely closed. As soon as the shot has been fired, the pressure of the gases causes the barrel extension a, the barrel b and the breech-block o to recoil at the same time, the said parts remaining during a portion of the said travel connected owing to the lever o′. After having traveled a certain distance, the barrel extension is stopped by a cross-bar z, which is fixed to the body but the breech block still continues its recoil movement and lowers the lever o′ sliding upward thereon till it also engages against the said rod z. At the moment of recoil, the extractor d has pulled the cartridge from the barrel so as to cause it to strike against the ejector and to project it out of the gun. At the end of the recoil, as in nearly all automatic fire arms, the recuperating spring m at the interior of the breech block which was completely compressed, partly expands and pushes forward the said block o, so that it repeats again the series of operations just described; i. e. effects the closing of the gun and cocks the striker. This advance of the breech block after the recoil is effected as follows: When the recoil of parts a, o and p has taken place by reason of the explosion of the charge, the spring m immediately comes into action to begin the counter-recoil by violently expanding. In its extension the said spring $m$ pushes forward the breech block $o$ together with striker $p$, until this is arrested by the sears $f$ or $g$ in cocked position, while the breech block $o$ continues to advance alone on account of the speed attained from the strong push of the spring $m$. It is to be noted that the recuperating spring $m$ at the moment of complete recoil is compressed against the collar $p'$ of the percussion pin $p$, which bears against the transverse pin $z$ fixed to the body and passing through the corresponding slots of barrel extension $a$, of breech block $o$ and on the collar $p'$. Evidently the said recuperating spring $m$ on expanding is stopped by pin $z$ from behind and effects its advance movement until the percussion pin $p$ will be locked in cocked position (Fig. 10) and the breech block $o$ continues its advance movement automatically by *vis inertia*. During this forward movement the breech block $o$ continuing to slide on the closing lever $o'$ arrives, with its notch $o'''$ in a position where it is engaged by $o'$ (Figs. 1, 6 and 10) so that the spring $n$ pulling strongly the closing lever $o'$, gives a strong push forward to the breech block $o$, which in its turn at the same time pushes forward the extension $a$ of the barrel $b$ with which it has made contact. The said push forward is that which effects the perfect closing of the breech.

From the above it will be seen that the recoil has two periods; 1st. A short recoil of the three parts together, namely $a$ the barrel extension, $o$ the breech block, and $p$ the striker; and second, a long recoil of the two parts $o$ and $p$ simultaneously. The advance movement has three periods. 1st. Advance of parts $o$ and $p$. 2nd. The stoppage of $p$, and the advance of $o$. 3rd. The advance of $o$ and $a$ together, for the last short space, thus placing the parts in the firing position, that is to say, with the breech perfectly closed.

When it is desired to change from firing at will to rapid automatic firing the firing indicator $i'$ is brought in agreement with the corresponding inscription. This movement results in lowering the right hand sear $g$ when pressure is applied to $y$ and causes it to remain fixed in that position, while limiting the travel of the press button $y$. However great a pressure is exercised on $y$, rapid firing takes place automatically every time that the closing lever $o'$ in completely closing the gun raises its tail which in its turn lowers the end of the left hand sear $f$ (Fig. 10). This lowering frees the striker allowing it to advance and operate. Thus auto-rapid automatic firing is obtained by placing the indicator $i'$ in a position in which it holds the press button $y$ in the limited or incomplete pressure position above mentioned. The safety position depends on another position of the indicator $i'$ which does not allow any pressure at all to be transmitted from the press button $y$.

Assuming now that a charging device is in the gun and that all the cartridges of the first compartment of the charging box $c'$ have been fired. The extension 3 of the elevator 2 which projects beyond the back wall of the charging device, has been entirely raised until it does not engage any more the side of a vertical projection $v'$, Figs. 6$^A$ and 4$^A$, of the body, but comes into engagement with a projection $v''$, Figs. 6$^A$ and 4$^A$, of the regulator $v$ and raises it in its turn, Figs. 1$^A$, 4$^A$ and 6$^A$. The bell crank lever $r$ is then released at the same time that the block recoils and pivots backward the feed-lever $t$ and its counter lever $u$ which, by means of its helical spring $s$ turns the lever $r$ from left to right. The escapement tooth of the lever $r$ during that rotation, comes into engagement with a tooth 5 of the rack of the charging device $c'$ and brings about its movement to an extent corresponding to the width of a compartment, and no more because the charging device $c'$ is held in that position by the extension 3 of the elevator 2 of the second compartment which comes into engagement with the said vertical projection $v'$ situated in the transverse opening of the body $c$.

The vertical projection will be clearly understood with reference to Fig. 4$^A$ of drawings where details are shown on larger scale. The regulator $v$ of the movement of the charging device —$c'$— with vertical compartments is a cylindrical rod having a top tooth $v''$ (Figs. 4$^A$ and 6$^A$) with an inner coil spring to keep it always depressed (Fig. 1$^A$) into its casing formed in the mass of the body and in which the said regulator is capable of rising and descending. When $v$ is lowered it opposes the bell crank lever "$r$" so as to keep it immovable. In its normal position the said regulator $v$ is always lowered (Fig. 1$^A$) while the elevator 2 of the compartment placed in the firing plane is equally lowered because the said compartment is filled with cartridges. In the said lowered position the extension 3 of elevator 2 opposes the vertical projection or step —$v'$—. To each elevation of cartridge corresponds an elevation of the elevator 2 and its extension 3. On the last cartridge of the compartment having entered the barrel the elevator 2 with extension 3 has risen to its uppermost (Figs. 6 and 6$^A$), that is to say has passed beyond the vertical projection $v'$ raising also to its uppermost the regulator $v$ which thus ceasing to oppose with its base the bell crank lever —$r$— permits the latter to be operated by its spring —$s$— (Figs. 1 and 6) and move along the slide face —$m'$— in the direction of the arrow (Fig. 4$^A$) a subsequent filled compartment which in turn is stopped in the firing plane by the vertical projection $v'$ and the extension 3 of the lowered elevator 2. When the block $o$ again advances, it pushes into the barrel the first cartridge of the second compartment, and the same series of operations as described take place, that is to say, the system of feeding works at each shot, but the displacement of the charging device takes place solely when the compartment is empty.

What I claim as my invention and desire to secure by Letters Patent is:—

1. In an automatic gun, the combination of a barrel, a barrel extension with a slot, a body or frame, a closing mechanism consisting of a lever turning upon a pivot fixed to the frame part or body, which lever passes through the said slot of the barrel extension, and a breech block having a notch for said lever and sliding in the barrel extension and containing the striking pin and a spring adapted for the double use of percussion and restoring the breech block to normal position after recoil.

2. In an automatic gun, the combination of a barrel, a barrel extension with a slot, a body or frame, a closing mechanism consisting of a lever turning upon a pivot fixed to the frame part or body, which lever passes through the said slot of the barrel extension, and a breech block having a notch for said lever and sliding in the barrel extension and containing the striking pin with a spring adapted for the double use of percussion and restoring the breech block to normal position after recoil, a metal charging device for renewing the ammunition consisting of a parallelepiped-shape box, means dividing said box into vertical compartments, a spring in each compartment, an elevator in each compartment having a projection or extension which slides in a slot in the vertical back wall of the compartments, a rack on the base of the charging device, and a plate to support the charging device when advancing.

3. In an automatic gun, the combination of a barrel and breech closing mechanism comprising a pivoted lever, a barrel extension containing a slot, an arm on said lever adapted to pass through said slot, a breech-block having a notch to engage wedge-like with the arm of said lever whereby the barrel recoils with the closing mechanism at the moment of firing, and after a short recoil movement alone, a charging device for renewing the ammunition consisting of a parallelepiped-shaped box, means dividing said box into vertical compartments, a spring and elevator in each of said compartments, an elevator extension adapted to project beyond the slot in the vertical back wall of the compartments and a plate to support the charging device, and means for advancing the charging device.

In testimony whereof I have signed my name to this specification in the presence of two subscribing witnesses.

BETHEL ABIEL REVELLI.

Witnesses:
DIULIO NARDONI,
G. BIZSARRI.

---

Copies of this patent may be obtained for five cents each, by addressing the "Commissioner of Patents, Washington, D. C."